(12) United States Patent
Lee et al.

(10) Patent No.: US 8,896,966 B2
(45) Date of Patent: Nov. 25, 2014

(54) MAGNETIC WRITE HEAD HAVING A COIL ADJACENT TO THE MAIN POLE

(71) Applicant: HGST Netherlands B.V., Amsterdam (NL)

(72) Inventors: Edward Hin Pong Lee, San Jose, CA (US); Aron Pentek, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/866,852

(22) Filed: Apr. 19, 2013

(65) Prior Publication Data
US 2014/0313613 A1    Oct. 23, 2014

(51) Int. Cl.
*G11B 5/147* (2006.01)

(52) U.S. Cl.
USPC ............................................. 360/123.5

(58) Field of Classification Search
USPC ................................................. 360/123.05
See application file for complete search history.

(56) References Cited

U.S. PATENT DOCUMENTS

| | | | |
|---|---|---|---|
| 6,483,662 B1 | 11/2002 | Thomas et al. | |
| 6,687,083 B2 | 2/2004 | Hsiao et al. | |
| 6,765,756 B1 | 7/2004 | Hong et al. | |
| 7,310,202 B2 | 12/2007 | Kief et al. | |
| 7,343,669 B2* | 3/2008 | Morita et al. | 29/603.16 |
| 7,748,104 B2 | 7/2010 | Bonhote et al. | |
| 7,791,837 B2* | 9/2010 | Fujiwara | 360/123.41 |
| 7,950,137 B2* | 5/2011 | Bonhote et al. | 29/603.16 |
| 8,218,263 B2* | 7/2012 | Allen et al. | 360/123.01 |
| 2002/0191334 A1 | 12/2002 | Hsu et al. | |
| 2012/0107645 A1 | 5/2012 | Zheng et al. | |
| 2012/0170429 A1 | 7/2012 | Zhou et al. | |

OTHER PUBLICATIONS

Nonaka et al., "Co—Ni—Fe write heads with a 10-µm yoke length for high-speed recording", IEEE Transactions on Magnetics, Sep. 2000, pp. 2514-2516, vol. 36, No. 5, URL: http://ieeexplore.ieee.org/stamp/stamp.jsp?tp=&arnumber=908490&isnumber=19613.

* cited by examiner

*Primary Examiner* — Mark Blouin
(74) *Attorney, Agent, or Firm* — John D. Henkhaus (57) ABSTRACT

Approaches for a magnetic write head having an adjacent coil architecture, wherein a coil turn is fabricated immediately adjacent to the writer main pole. The adjacent coil portion essentially lies on the main pole, except for a very thin layer of insulation atomically layered in between. The adjacent coil portion is also substantially closer to the wrap-around shield in comparison with conventional coil configurations. Further, the other upper coil portions may be fabricated to essentially lie on the stitch pole, again except for a very thin atomic layer deposited layer of insulation layered between. This adjacent coil configuration provides a writer coil configuration that concentrates the coil structure significantly closer to the main pole surface, as well as concentrates more of the coil structure closer to the main pole tip, providing for a more efficient and faster write head.

17 Claims, 6 Drawing Sheets

MAGNETIC WRITE HEAD HAVING A COIL ADJACENT TO THE MAIN POLE

FIELD OF THE INVENTION

Embodiments of the invention relate generally to perpendicular magnetic recording and more particularly to a magnetic writer having a coil turn adjacent to the main pole for increased efficiency.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates.

Figure 2:
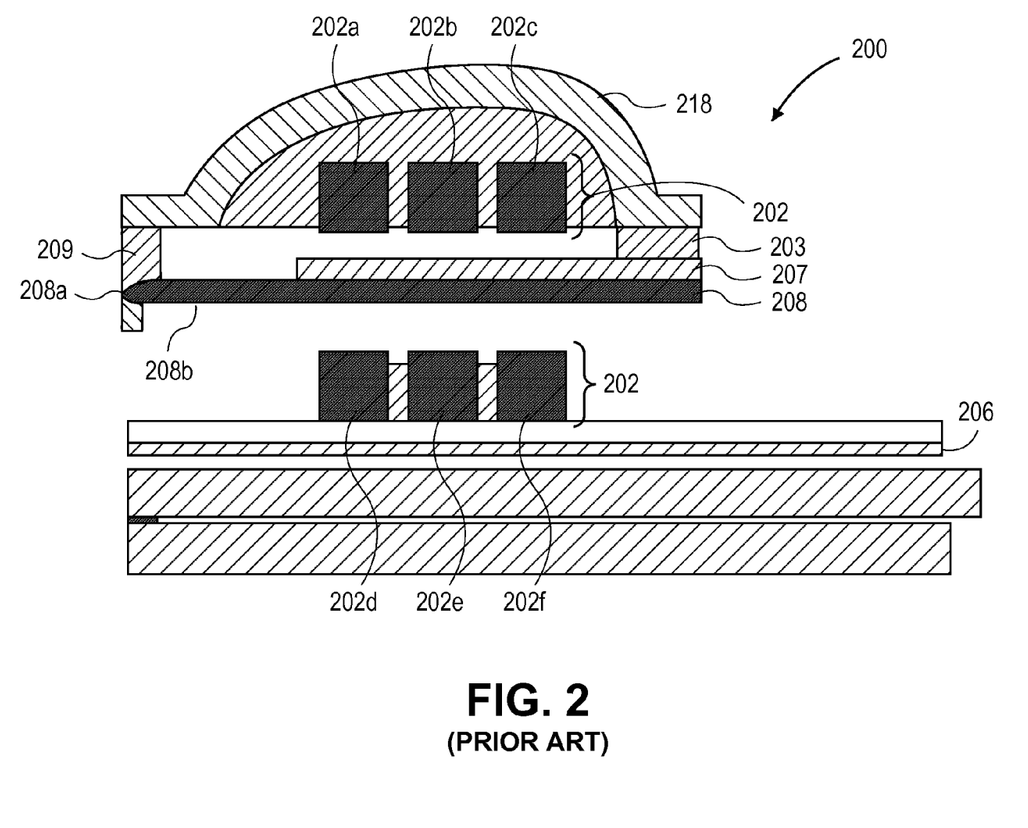
FIG. 2 is a cross-sectional side view of a conventional write head.

FIG. 2 is a cross-sectional side view of a conventional write head. Write heads make use of the electricity flowing through a coil 202 in the write head 200, which produces a magnetic field. One type of coil design is referred to as a helical coil because it wraps around the write pole, e.g., main pole 208, in a helical shape. Such a write head includes a helical write coil having upper coil portions 202a, 202b, 202c that pass above the write pole and lower coil portions 202d, 202e, 202f that pass below the write pole. The upper and lower coil portions are connected with each other by connection tabs. Electrical pulses are sent to the write head, with different patterns of positive and negative currents. The current in the coil of the write head induces a magnetic field across the gap between the head and the magnetic disk, which in turn magnetizes a small area on the recording medium.

A perpendicular magnetic recording (PMR) system records data as magnetizations oriented perpendicular to the plane of the magnetic-recording disk. The magnetic disk has a magnetically soft underlayer covered by a thin magnetically hard top layer. The perpendicular write head has a write pole (main pole 208) with a very small cross section at the pole tip 208a, tapered down from the cross section along the length of the yoke 208b from which the pole tip protrudes, a lower return pole 206, and an upper return pole 218 having a much larger cross section along the length. Also shown in FIG. 2 is a stitch pole 207 for assisting in delivering the magnetic field, and a wrap-around shield 209 for assisting in focusing the magnetic field emitting from pole tip 208a. Note that with conventional write heads configured such as write head 200, the upper coil portions 202a, 202b, 202c are necessarily some distance from the stitch pole 207 and the main pole 208, separated by a relatively thick insulation material layer such as alumina or hard-baked photoresist.

A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Advanced PMR writers demand high data rate write heads, especially for advanced server products. For high data rate performance, a shorter yoke length write head is faster in writing data bits, for the same total write current. Thus, the shorter the yoke length, and the higher the number of coil turns, the faster the write head. However, in conventional write heads, yoke length reduction is challenging in part because of the limited amount of space available for the coil to wrap around a shorter yoke.

SUMMARY OF EMBODIMENTS OF THE INVENTION

Coil turns closer to the main pole tip, or ABS, are more effective than coil turns further back away from the pole tip. Further, coil turns closer to the main pole surface are more effective than coil turns further back away from the pole surface.

Embodiments of the invention are directed towards a magnetic write head having an "adjacent coil" architecture, wherein a coil turn is fabricated immediately adjacent to the writer main pole. In embodiments, the adjacent coil portion essentially lies on the main pole, except for a very thin layer of alumina or other insulation material atomically layered in between the adjacent coil portion and the main pole. Further, the adjacent coil portion is substantially closer to the wrap-around shield in comparison with conventional coil configurations. Further in embodiments, the other upper coil portions essentially lie on the stitch pole, again except for a very thin atomic layer deposited layer of alumina or other insulation material layered between the coil portions and the stitch pole.

This adjacent coil configuration provides a practical, readily manufacturable writer coil configuration that concentrates more of the coil structure (and, thus, more current) closer to the main pole tip, as well as concentrates the coil structure significantly closer to the main pole surface. Both of the foregoing features provide for a more efficient and faster, i.e., higher data rate, write head in comparison with conventional coil configurations.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to the configuration and the manufacturing process for a magnetic write head having a write coil turn immediately adjacent to the main write pole, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

PHYSICAL DESCRIPTION OF ILLUSTRATIVE EMBODIMENTS OF THE INVENTION

Figure 1:
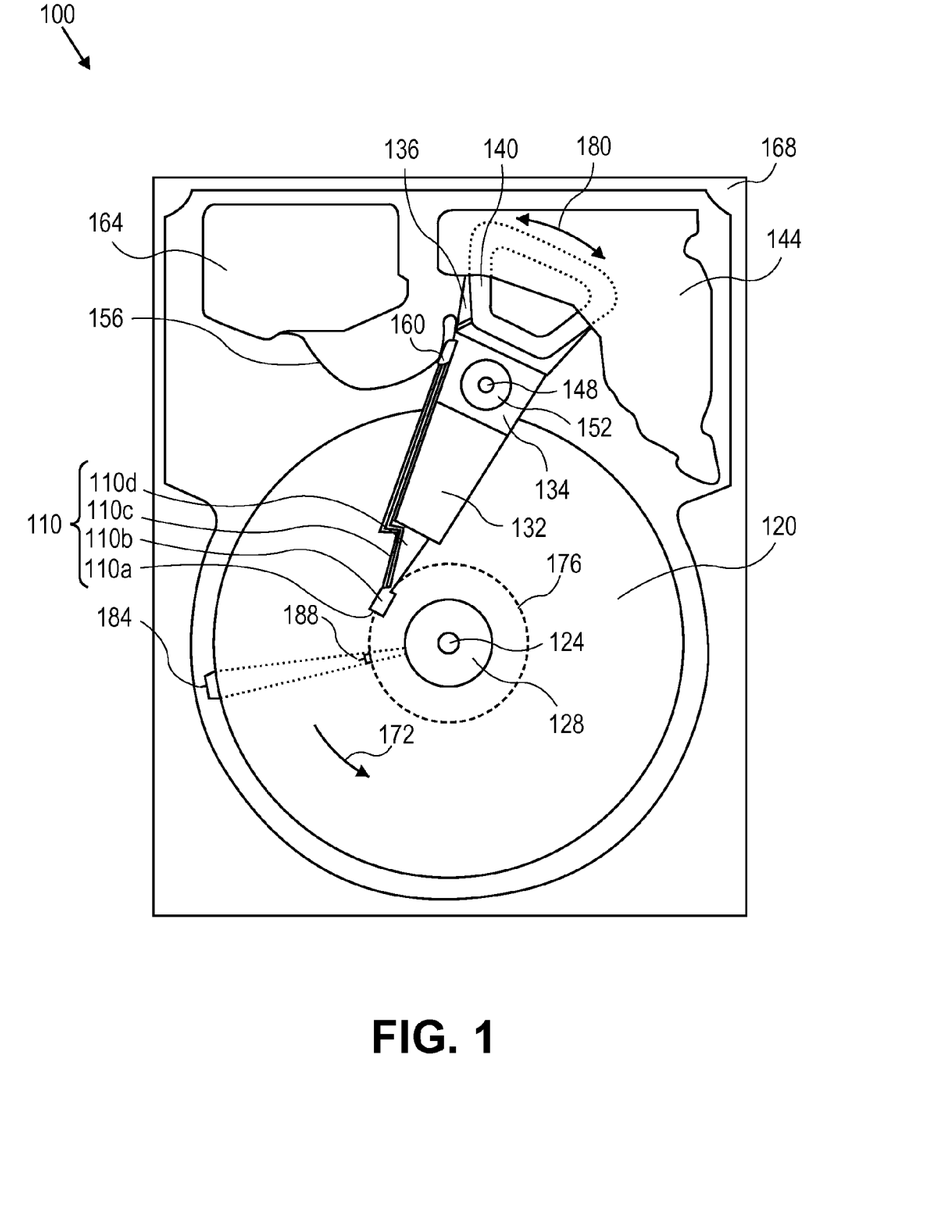
FIG. 1 is a plan view of an HDD, according to an embodiment of the invention.

Embodiments of the invention may be used in the context of the manufacturing and use of a magnetic writer for a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown.

The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Magnetic Write Head Having a Coil Turn Adjacent to the Main Pole

Coil turns closer to the main pole tip, or ABS, are more effective than coil turns further back away from the pole tip. Thus, for a coil turn carrying the same amount of current, the closer the coil is to the pole tip the more efficient the coil is at driving the pole tip. Further, coil turns closer to the main pole surface are more effective than coil turns further back away from the pole surface. Thus, for a coil turn carrying the same amount of current, the closer the coil is to the main pole the more efficient the coil is at driving the pole tip.

A First Adjacent Coil Configuration

Figure 3:
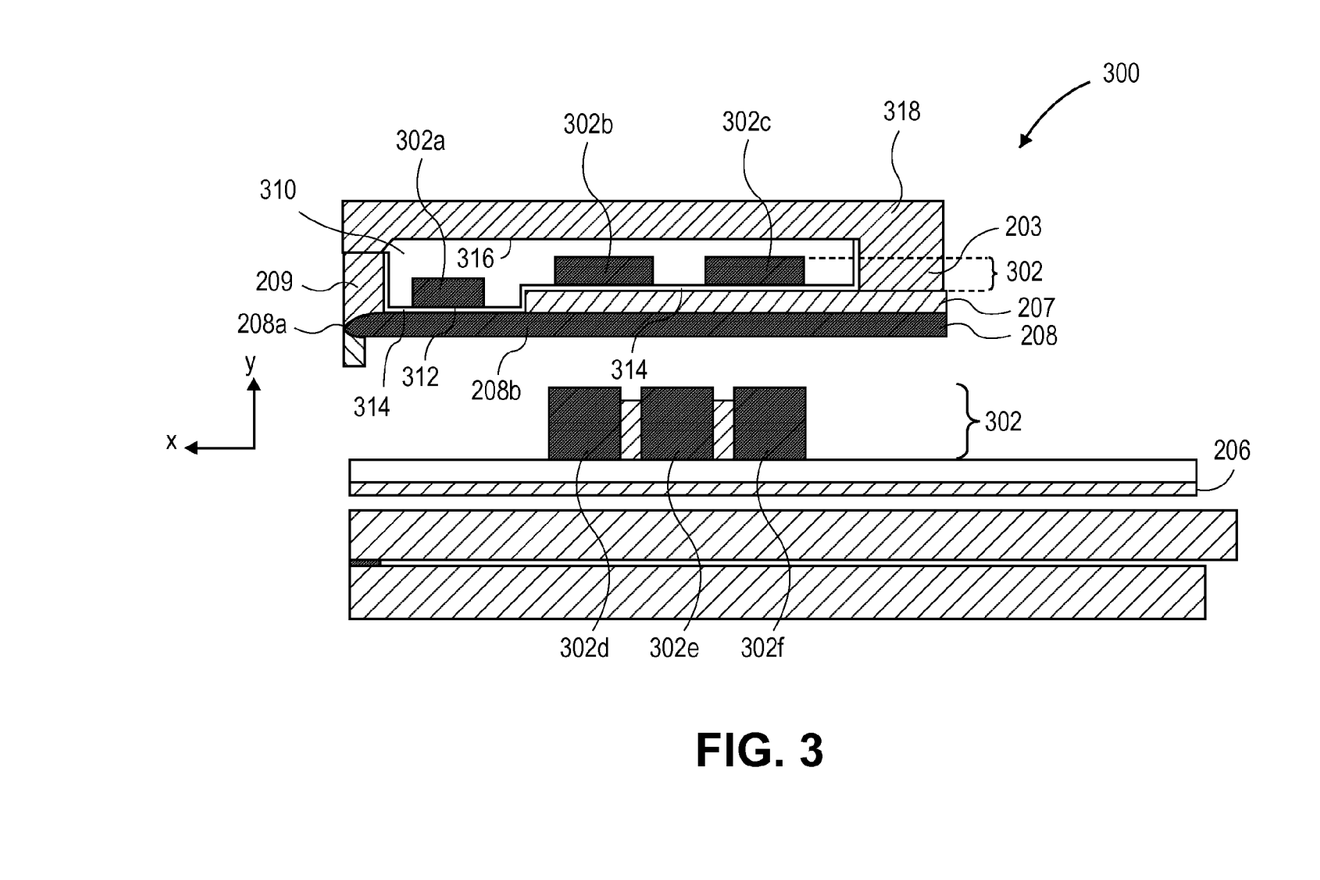
FIG. 3 is a cross-sectional side view of a magnetic writer having a coil portion adjacent the main pole, according to a first embodiment of the invention.

FIG. 3 is a cross-sectional side view of a magnetic writer having a coil portion adjacent the main pole, according to a first embodiment of the invention. This provides a coil architecture that concentrates more current density toward the front of the main pole and current closer to the main pole, both of which further enhances the efficiency of the write head.

A two-dimensional coordinate system is illustrated in FIG. 3, with the X-direction being positive toward the pole tip and ABS and with the Y-direction being positive toward the upper return pole. The terms "above", "over", "on top of", "higher than", "upper", and the like, if used herein refer to elements from a perspective in the positive Y-direction because such elements are generally fabricated with a series of processes/layers in the positive Y-direction. Likewise, the terms "below", "under", "lower than", "lower", and the like, if used herein refer to elements from a perspective in the negative Y-direction. Similarly, relative terms used in reference to the X-direction are from a perspective in the positive X-direction, e.g., in a direction from the back gap to the pole tip.

Magnetic writer 300 comprises a main pole 208 having a pole tip 208a and a yoke 208b, a lower return pole 206, an upper return pole 318, and an "adjacent coil" 302. Adjacent coil 302 comprises a plurality of upper coil portions 302a, 302b, 302c, and a plurality of lower coil portions 302d, 302e, 302f. Three upper and lower coil turns are depicted in FIG. 3 for purposes of explanation, however, embodiments of the invention are not limited to three coil turns, and the number of coil turns may vary from implementation to implementation.

Upper coil portions 302a, 302b, 302c are referred to as an "adjacent coil" configuration, because at least one coil portion is configured immediately adjacent to the surface of the main pole 208. In this embodiment, the adjacent coil portion 302a essentially lies on the main pole 208, except for a very thin layer of alumina 314 or other insulation material layered in between the adjacent coil portion 302a and the main pole 208. Further, adjacent coil portion 302a is substantially closer to the WAS 209 in comparison with the conventional coil configuration shown in FIG. 2, e.g., coil portion 302a is also adjacent the WAS 209 in the direction along the length of the main pole 208 (in the X direction, as illustrated in the coordinates of FIG. 3). Furthermore, the other upper coil portions 302b, 302c essentially lie on the stitch pole 207, again except for a very thin atomic layer deposited layer of alumina 314 or other insulation material layered between the coil portions 302b, 302c and the stitch pole 207.

This adjacent coil configuration provides a practical, readily manufacturable writer coil configuration that concentrates more of the coil structure (and, thus, more current) closer to the main pole tip 208a than does the conventional coil configuration shown in FIG. 2, as well as concentrates the coil structure significantly closer to the main pole 208 of the writer. Both of the foregoing features provide for a more efficient and faster, i.e., higher data rate, write head in comparison with the coil configuration shown in FIG. 2.

Manufacturing a Magnetic Write Head Adjacent Coil

Figure 4:
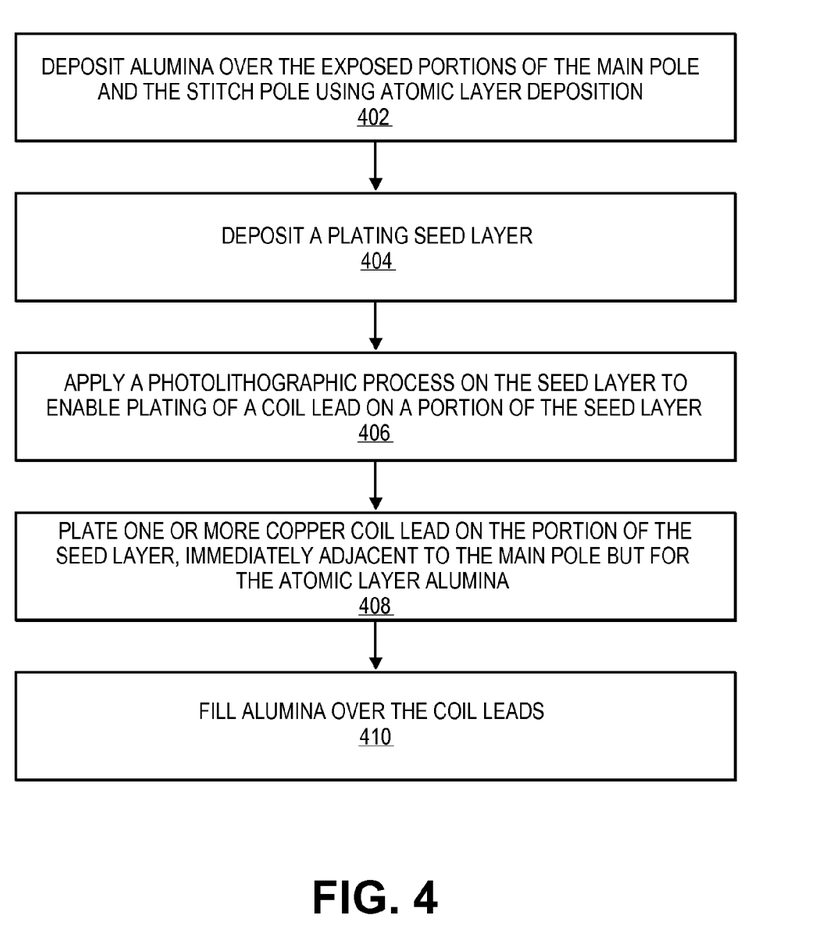
FIG. 4 is a flow diagram illustrating a method of manufacturing a magnetic writer having a coil portion adjacent the main pole, according to a first embodiment of the invention.

FIG. 4 is a flow diagram illustrating a method of manufacturing a magnetic writer having a coil portion adjacent the main pole, according to a first embodiment of the invention. Having introduced the concept of an adjacent coil architecture for a magnetic write head, in reference to magnetic writer 300 of FIG. 3, a method for manufacturing such an adjacent coil is now described with reference to FIG. 4. Conventional techniques may be used for the manufacturing of the read head, the lower return pole 206, and lower coil portions 302d, 302e, 302f.

At block 402, alumina or other insulation material is deposited over the exposed portions of the main pole and the stitch pole, using atomic layer deposition (ALD) process. For example, an alumina (aluminum oxide) layer 314 (FIG. 3) is atomic layer deposited over the exposed portion of main pole 208 and the exposed portion of stitch pole 207, using ALD process. Thus, there is now a conformal alumina insulation layer isolating the main pole 208 and stitch pole 207 from any subsequent layers of writer 300 (FIG. 3), such as a subsequently plated upper coil portions 302a, 302b, 302c (FIG. 3). The alumina in the contact area for the lower coil is removed first before the formation of the upper coils. In conventional writer heads such as writer head 200 (FIG. 2), a bulk alumina fill process is used, such as sputtering or bulk depositing. Consequently, a thin conformmal layer of alumina is not achieved and the coil turns are necessarily farther away from the main pole. The alumina is eventually removed from areas in which it is undesirable, such as areas that will serve as contact areas for an upper return pole (see upper return pole 318 of FIG. 3), such as the area above wrap-around shield (WAS) 209 and the area of the back gap 203 (FIG. 3).

At block 404, a plating seed layer is deposited. For example, an electrically conductive seed layer 312 (FIG. 3), such as copper or gold, is deposited over the thin layer of alumina or other insulation material to provide electrical leads for the subsequent plating process.

At block 406, a photolithographic process is applied on the seed layer, to enable the plating of a coil lead (also referred to herein as a "coil portion"), on a portion of the seed layer.

As known in the art, photolithography is a process used to pattern parts of a thin film or the bulk of a substrate. The photolithography process uses light to transfer a pattern from a photomask to a light-sensitive chemical photoresist on the substrate. A series of chemical treatments then either engraves the exposure pattern into, or enables deposition of a new material in the desired pattern. Here, the photolithographic process is utilized to define the shape, or footprint, of the coil leads or turns (such as coil portions 302a, 302b, 302c) that are subsequently plated (e.g., at block 408).

At block 408, one or more copper coil lead is plated on the portion of the seed layer. For example, upper coil portions 302a, 302b, 302c (FIG. 3) are plated onto the portion of the seed layer 312 (FIG. 3). Block 408 involves plating coil portion 302a between the WAS 209 (FIG. 3) and the stitch pole 207 (FIG. 3), as illustrated in FIG. 3 and according to an embodiment. The WAS 209 and stitch pole 207 are referred to here as points of reference for the location of the coil portion 302a. However, the write head configuration may vary from implementation to implementation and, therefore, some write heads may not comprise a WAS and/or a stitch pole. Therefore, each and every embodiment is not limited to plating coil portion 302a between a WAS and a stitch pole.

Notably, the coil portion 302a is plated immediately adjacent to main pole 208, in the direction away from main pole 208, i.e., right on top of main pole 208 (except for, or but for, the very thin layer of alumina or other insulation material deposited at block 402).

Block 408 also involves plating any other upper coil portions. For example, coil portion 302b and coil portion 302c are plated immediately adjacent to stitch pole 207, in the direction away from main pole 208 and stitch pole 207, i.e., right on top of stitch pole 207 (except for the very thin layer of alumina or other insulation material deposited at block 402). Again, the write head configuration may vary from implementation to implementation and, therefore, some write heads may not comprise a stitch pole. Thus, each and every embodiment is not limited to plating coil portion 302b and coil portion 302c on top of a stitch pole. Rather, in an embodiment in which the write head does not comprise a stitch pole, coil portions 302b, 302c may be plated immediately adjacent to the main pole 208, similarly to coil portion 302a. The coil seed layer is then removed by ion milling or sputter etching.

At block 410, alumina or other insulation material is filled into the volume above the coil leads plated at block 408. For example, alumina 310 is filled in over coil portions 302a, 302b, 302c.

Each upper coil portion 302a, 302b, 302c is connected to one or more corresponding lower coil portion 302d, 302e, 302f via one or more electrically conductive tab, thereby completing an electrically contiguous coil structure. Additionally, at least two of the coil portions 302a, 302b, 302c, 302d, 302e, 302f are connected to a lead for electrically connecting with a slider electrical connection pad.

After the alumina fill step (block 410), the assembly is planarized. For example, a CMP (chemical-mechanical polishing, or chemical-mechanical planarization) process is performed to planarize the alumina fill and possibly portions of the WAS 209 and back gap 203. Once the assembly is planarized, then upper return pole 318 is manufactured. To manufacture the upper return pole 318, the alumina is removed from the area above WAS 209 and the area of the back gap 203, e.g., by the CMP process. Optionally, the alumina fill may be chamfer milled in order to create a chamfered area adjacent to the WAS 209, for enabling manufacture of a chamfered upper return pole 318 which provides for better magnetic flux flow than a non-chamfered, or "squared", upper return pole.

To manufacture the upper return pole 318, according to an embodiment, a NiFe plating seed layer 316 is deposited over alumina layer 310 and a photolithographic process applied to the seed layer 316 to prepare it for the plating process. A soft magnetic upper return pole 318 is then plated over the seed layer 316, with upper return pole 318 having contact areas with WAS 209 and back gap 203, thus completing writer 300. Alternatively, upper return pole 318 may be deposited rather than plated over alumina layer 310, thereby eliminating the need for the seed layer portion of the process.

Short Yoke Length Coil Configurations

Figure 5:
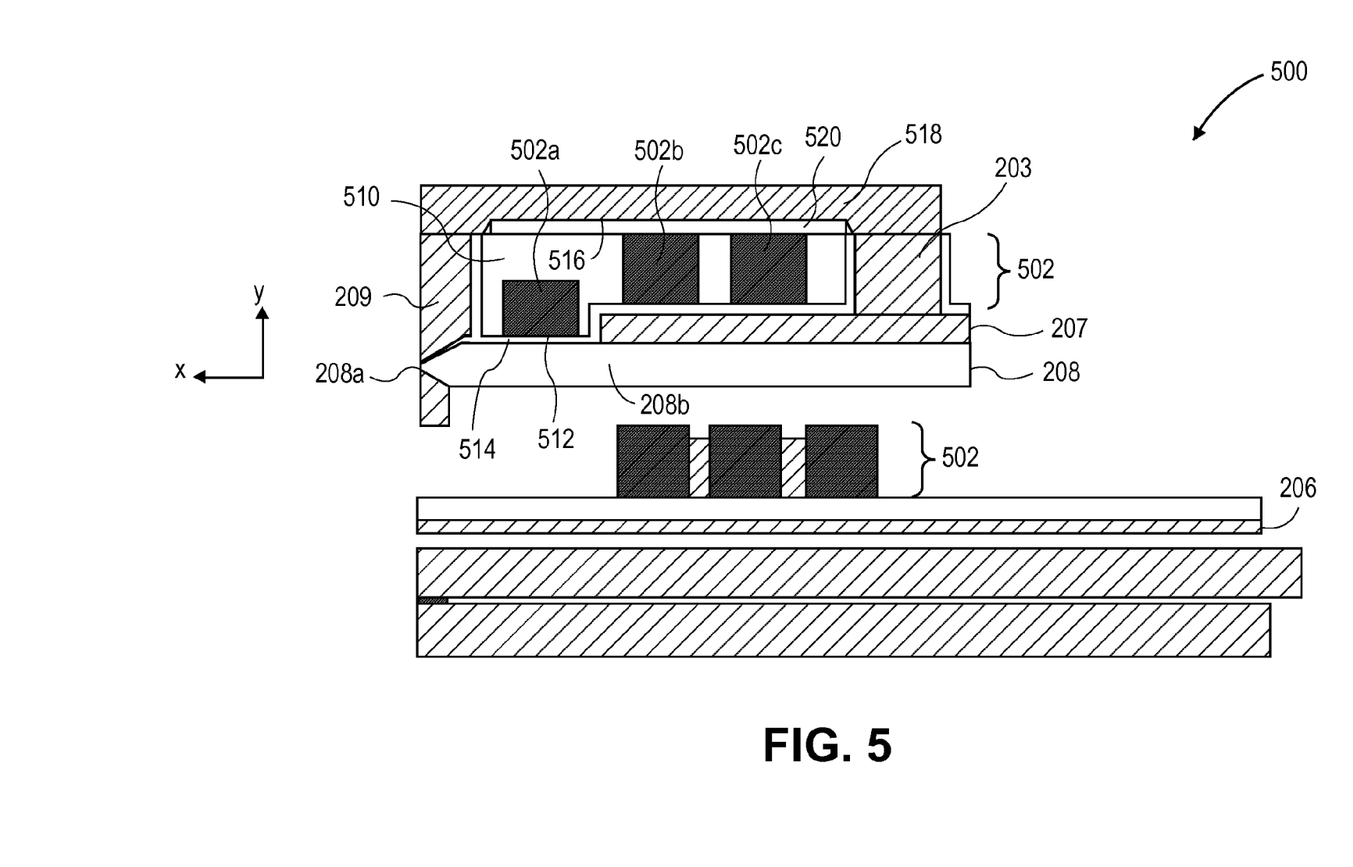
FIG. 5 is a cross-sectional side view of a magnetic writer having a coil portion adjacent the main pole, according to a second embodiment of the invention.

FIG. 5 is a cross-sectional side view of a magnetic writer having a coil portion adjacent the main pole, according to an embodiment of the invention. Similarly to magnetic writer 300 (FIG. 3), magnetic writer 500 comprises a main pole 208 having a pole tip 208a and a yoke 208b, a lower return pole 206, an upper return pole 518, and an adjacent coil 502. However, in comparison with coil portions 302a, 302b, 302c (FIG. 3), adjacent coil 502 comprises upper coil portions 502a, 502b, 502c that are configured for a short yoke length main pole, because the coil portions 502a, 502b, 502c are taller/thicker in the direction away from the main pole 208 toward the upper return pole 518 (in the Y direction, as illustrated in the coordinates of FIG. 5), e.g., 502b and 502c as tall as the WAS 209 and back gap 203, and may be thinner in the direction along the length of the main pole 208 (in the X direction, as illustrated in the coordinates of FIG. 5), thereby providing a lower resistance/higher current coil. Alternatively, a wider coil (in the X direction) may be implemented, foregoing the shorter yoke to some degree, but providing an even lower resistance coil having an even higher current, without heating the head significantly more. Three upper and lower coil turns are depicted in FIG. 5 for purposes of explanation, however, embodiments of the invention are not limited to three coil turns, and the number of coil turns may vary from implementation to implementation.

The upper coil portions 502a, 502b, 502c of magnetic writer 500 are configured similar to and may be manufactured the same as, or similar to, magnetic writer 300 (FIG. 3). Upper coil portions 502a, 502b, 502c are referred to as an "adjacent coil" configuration because at least one coil portion is configured immediately adjacent to the surface of the main pole 208. In this embodiment, the adjacent coil portion 502a essentially lies on the main pole 208, except for a very thin layer of alumina 514 or other insulation material layered in between the adjacent coil portion 502a and the main pole 208. Furthermore, the other upper coil portions 502b, 502c essentially lie on the stitch pole 207, again except for a very thin atomic layer deposited layer of alumina 514 or other insulation material layered between the coil portions 502b, 502c and the stitch pole 207.

The same or similar process as illustrated in FIG. 4 can be used to manufacture magnetic writer 500 (FIG. 5). That is, to lay down the upper coil portions 502a, 502b, 502c, a similar process as that depicted in FIG. 4 may be followed. As such, a very thin layer of alumina or other insulation material is atomic layer deposited over exposed portions of the main pole 208 and stitch pole 207 (similar to block 402), a plating seed layer 512a is deposited (similar to block 404), a photolithographic process is applied to this seed layer to enable plating of upper coil portions 502a, 502b, 502c on portions of the seed layer (similar to block 406), and each of the copper coil leads 502a, 502b, 502c is plated on the portion of the seed layer (similar to block 408). Similarly, alumina 510 or other insulation material is filled over the coil leads 502a, 502b, 502c using atomic layer deposition (ALD) process (similar to block 410).

After the alumina fill step (similar to block 410), the assembly is planarized. For example, a CMP (chemical-mechanical polishing, or chemical-mechanical planarization) process is performed to planarize the alumina fill and possibly portions of the WAS 209 and back gap 203. Once the assembly is planarized, then upper return pole 518 is manufactured. To manufacture the upper return pole 518, the alumina is removed from the area over WAS 209 and the area over back gap 203, e.g., by the CMP process. An alumina lift-off process is then utilized to deposit a shaped layer of alumina 520 over the coil leads 502a, 502b, 502c to protect the coil from shorting with the upper return pole 518, but not deposited over the WAS 209 and back gap 203 to allow for contact with each end of the upper return pole 518.

As known in the art, a lift off process is an additive technique for creating structures (patterning) of a target material on the surface of a substrate using a sacrificial material, such as photoresist. An inverse pattern is first created in the sacrificial stencil layer (e.g., the photoresist) deposited on the surface of the substrate by, for example, etching openings through the sacrificial layer so that the target material can reach the surface of the substrate in those regions, where the final pattern is to be created. The target material is deposited, reaching the surface of the substrate in the etched regions and staying on the top of the sacrificial layer in the regions where it was not previously etched. When the sacrificial layer is washed away, the material on the top is lifted-off and washed away together with the sacrificial layer below. Thus, after the lift-off, the target material remains only in the regions where it had a direct contact with the substrate.

To manufacture the upper return pole 518, according to an embodiment, a NiFe plating seed layer 516 is deposited over alumina layer 520 and a photolithographic process applied to the seed layer 516 to prepare it for the plating process. A soft magnetic upper return pole 518 is then plated over the seed layer 516, with upper return pole 518 having contact areas with WAS 209 and back gap 203, thus completing writer 500. Alternatively, upper return pole 518 may be deposited rather than plated over alumina layer 520, thereby eliminating the need for the seed layer 516 portion of the process.

Not only does the adjacent coil configuration of magnetic writer 500 provide a practical, readily manufacturable configuration for a short yoke length write head, because it can be configured to need and use less space along the direction of the main pole toward the ABS (X direction), but it also concentrates more of the coil structure (and, thus, more current) closer to the main pole tip 208a and closer to the WAS 209 (in the X direction) than does the conventional coil configuration shown in FIG. 2, as well as concentrates the coil structure significantly closer to the main pole 208 of the writer (in the Y direction). Each of the foregoing features provide for a more efficient and faster, i.e., higher data rate, write head in comparison with the coil configuration shown in FIG. 2.

Figure 6:
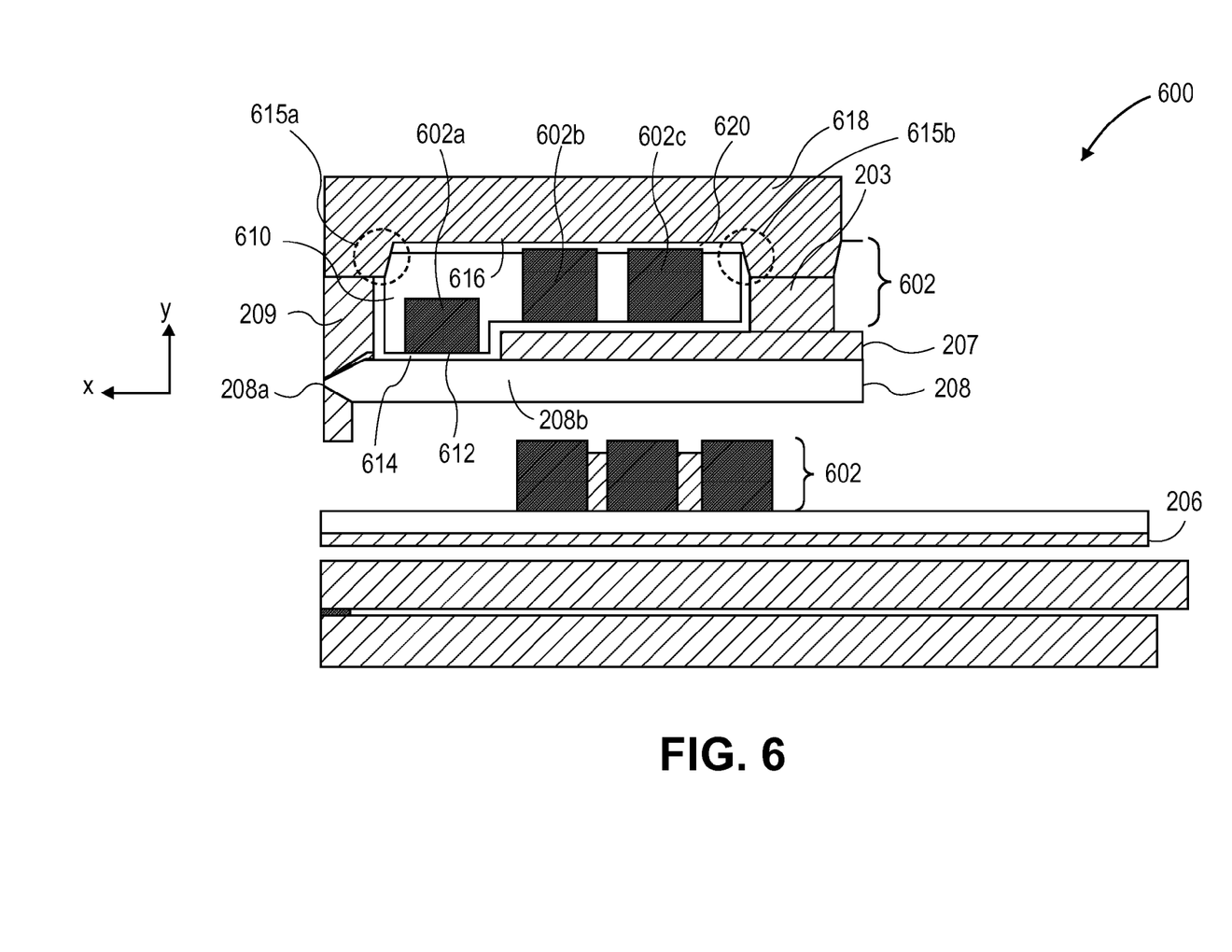
FIG. 6 is a cross-sectional side view of magnetic writer having a coil portion adjacent the main pole, according to a third embodiment of the invention.

According to an embodiment, a chamfered upper return pole is fabricated over the upper coil portions. FIG. 6 is a cross-sectional side view of magnetic writer having a coil portion adjacent the main pole, according to an embodiment of the invention.

Similarly to magnetic writer 500 (FIG. 5), magnetic writer 600 comprises a main pole 208 having a pole tip 208a and a yoke 208b, a lower return pole 206, an upper return pole 618, and an adjacent coil 602. However, in comparison with coil portions 302a, 302b, 302c (FIG. 3), adjacent coil 502 comprises upper coil portions 502a, 502b, 502c that are configured for a short yoke length main pole, because the coil portions 502a, 502b, 502c are taller/thicker in the direction away from the main pole 208 toward the upper return pole 518 (in the Y direction, as illustrated in the coordinates of FIG. 5), and may be thinner in the direction along the length of the main pole 208 (in the X direction, as illustrated in the coordinates of FIG. 5), thereby providing a lower resistance/higher current coil. Alternatively, a wider coil (in the X direction) may be implemented, foregoing the shorter yoke to some degree, but providing an even lower resistance coil having an even higher current, without heating the head significantly more. Three upper and lower coil turns are depicted in FIG. 6 for purposes of explanation, however, embodiments of the invention are not limited to three coil turns, and the number of coil turns may vary from implementation to implementation.

The upper coil portions 602a, 602b, 602c of magnetic writer 600 are configured similar to and may be manufactured the same as, or similar to, magnetic writer 500 (FIG. 5). Upper coil portions 602a, 602b, 602c are referred to as an "adjacent coil" configuration because at least one coil portion is configured immediately adjacent to the surface of the main pole 208. In this embodiment, the adjacent coil portion 602a essentially lies on the main pole 208, except for a very thin layer of alumina 614 (e.g., atomic layer thickness) or other insulation material layered in between the adjacent coil portion 602a and the main pole 208. Furthermore, the other upper coil portions 602b, 602c essentially lie on the stitch pole 207, again except for a very thin atomic layer deposited layer of alumina 614 or other insulation material layered between the coil portions 302b, 302c and the stitch pole 207.

The same or similar process as that described in reference to magnetic writer 500 of FIG. 5 can be used to manufacture a portion of magnetic writer 600 (FIG. 6). That is, to lay down the upper coil portions 602a, 602b, 602c, a similar process as that depicted in FIG. 4 may be followed, up to the point that alumina 610 is filled over the coil leads 602a, 602b, 602c using atomic layer deposition (ALD) process (similar to block 410) and the assembly is planarized, using CMP for example.

Once the assembly is planarized, then upper return pole 618 is manufactured. However, the magnetic writer 600 comprises a chamfered upper return pole 618. To manufacture the chamfered upper return pole 618, a full film alumina layer 620 or other insulation material is, e.g., sputtered or deposited, over the coil portions 602a, 602b, 602c to protect the coil from shorting with the upper return pole 518. A photoresist is applied over the alumina and the alumina is milled away from the contact areas, i.e., the area above WAS 209 and the area of the back gap 203. Additionally, the milling process is used to remove a portion of the WAS 209 and back gap 203, to shorten the height of each, whereby the upper coil portions 602b and 602c are now taller than the WAS 209 and back gap 203. Further, an appropriate milling angle is used to mill away portions of the WAS 209 and back gap 203 so that the alumina takes a chamfered shape at each end, such as illustrated by area 615a and area 615b, which provides for better magnetic flux flow than a non-chamfered, or "squared", upper return pole, thereby allowing for faster magnetic flux return.

To manufacture the upper return pole 618, according to an embodiment, a NiFe plating seed layer 616 is deposited over alumina layer 620 and a photolithographic process applied to the seed layer 616 to prepare it for the plating process. A soft magnetic upper return pole 618 is then plated over the seed layer 616, with upper return pole 618 having contact areas with WAS 209 and back gap 203, thus completing writer 600. Alternatively, upper return pole 618 may be deposited rather than plated over alumina layer 620, thereby eliminating the need for the seed layer 616 portion of the process.

Not only does the adjacent coil configuration of magnetic writer 500 provide a practical, readily manufacturable configuration for a short yoke length write head, because it can be configured to need and use less space along the direction of the main pole toward the ABS (X direction), but it also concentrates more of the coil structure (and, thus, more current) closer to the main pole tip 208a and closer to the WAS 209 (in the X direction) than does the conventional coil configuration shown in FIG. 2, as well as concentrates the coil structure significantly closer to the main pole 208 of the writer (in the Y direction). Each of the foregoing features provide for a more efficient and faster, i.e., higher data rate, write head in comparison with the coil configuration shown in FIG. 2.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A magnetic write head comprising:
   a magnetic write pole extending to an air bearing surface;
   a magnetic return pole, magnetically connected with said write pole in a region removed from said air bearing surface;
   a write coil arranged around said write pole so as to induce a magnetic flux in said write pole when electrical current flows through said write coil, said write coil comprising:
      a plurality of lower coil portions positioned on a first side of said write pole;
      a plurality of upper coil portions positioned on a second side of said write pole opposing said first side;
      wherein said plurality of upper coil portions comprises at least one upper coil portion immediately adjacent to a main pole of said write pole but for only an atomic-layer-deposited insulation layer between said main pole and said at least one upper coil portion; and a plurality of electrically conductive tabs each connecting a lower coil portion with an upper coil portion.

2. The magnetic write head of claim 1,
wherein said at least one upper coil portion is adjacent to said main pole in a direction toward an upper return pole.

3. The magnetic write head of claim 1,
wherein at least one upper coil portion is immediately adjacent to a stitch pole but for only an atomic layer deposited insulation layer between said stitch pole and said at least one upper coil portion.

4. The magnetic write head of claim 1,
wherein said plurality of upper coil portions are located lower than a lowest portion of an upper return pole.

5. The magnetic write head of claim 1,
wherein an uppermost location of at least one of said plurality of upper coil portions is located substantially planar with a lowest portion of an upper return pole.

6. The magnetic write head of claim 1,
wherein an uppermost location of at least one of said plurality of upper coil portions is located higher than a lowest portion of a chamfered upper return pole.

7. The magnetic write head of claim 1,
wherein said at least one upper coil portion is adjacent to a wrap-around shield in a direction toward a back gap.

8. A method for manufacturing a write coil in a magnetic write head, the method comprising:

depositing a first insulation layer over exposed portions of a main pole and a stitch pole using atomic layer deposition;

depositing a plating seed layer on said first insulation layer;

applying a photolithographic process on said seed layer to enable plating of a coil portion on a portion of said seed layer;

plating one or more copper coil portion on said portion of said seed layer immediately adjacent to said main pole but for said atomic layer deposited first insulation layer; and filling second insulation over said one or more coil portion.

9. The method of claim 8,
wherein said plating further comprises plating one or more copper coil portion on said portion of said seed layer immediately adjacent to said stitch pole but for said atomic layer deposited first insulation layer.

10. The method of claim 8, further comprising:

planarizing said second insulation, including removing any of said second insulation that is on top of a wrap-around shield and any of said second insulation that is on top of a back gap;

depositing a third insulation layer over said one or more copper coil portion using a lift-off process, to protect said one or more copper coil portion from shorting with an upper return pole that is fabricated over said one or more copper coil portion.

11. The method of claim 8, further comprising:

planarizing said second insulation, including removing any of said second insulation that is on top of a wrap-around shield and any of said second insulation that is on top of a back gap;

depositing a third insulation layer over said one or more copper coil portion, to protect said one or more copper coil portion from shorting with a chamfered upper return pole that is fabricated over said one or more copper coil portion;

applying a photoresist on a portion of said third insulation layer;

milling to remove a portion of said third insulation layer that is not covered with said photoresist, a portion of said wrap-around shield, and a portion of said back gap, including creating a chamfered shape on at least one end area of said third insulation layer; and fabricating said chamfered upper return pole over said one or more copper coil portion.

12. A hard disk drive, comprising:
a head slider comprising a magnetic write head;
a magnetic-recording disk rotatably mounted on a spindle;
a voice coil motor configured to move the head slider to access portions of the magnetic-recording disk; and
wherein said write head comprises:
a magnetic write pole extending to an air bearing surface;
a magnetic return pole, magnetically connected with said write pole in a region removed from said air bearing surface;
a write coil arranged around said write pole so as to induce a magnetic flux in said write pole when electrical current flows through said write coil, said write coil comprising:
a plurality of lower coil portions positioned on a first side of said write pole;
a plurality of upper coil portions positioned on a second side of said write pole opposing said first side;
wherein said plurality of upper coil portions comprises at least one upper coil portion immediately adjacent to a main pole of said write pole but for only an atomic-layer-deposited insulation layer between said main pole and said at least one upper coil portion; and
a plurality of electrically conductive tabs each connecting a lower coil portion with an upper coil portion.

13. The hard disk drive of claim 12,
wherein at least one upper coil portion is immediately adjacent to a stitch pole but for only an atomic layer deposited insulation layer between said stitch pole and said at least one upper coil portion.

14. The hard disk drive of claim 12,
wherein said plurality of upper coil portions are located lower than a lowest portion of an upper return pole.

15. The hard disk drive of claim 12,
wherein an uppermost location of at least one of said plurality of upper coil portions is located substantially planar with a lowest portion of an upper return pole.

16. The hard disk drive of claim 12,
wherein an uppermost location of at least one of said plurality of upper coil portions is located higher than a lowest portion of a chamfered upper return pole.

17. The hard disk drive of claim 12,
wherein said at least one upper coil portion is adjacent to a wrap-around shield in a direction toward a back gap.

* * * * *